United States Patent
Talley et al.

(10) Patent No.: US 7,848,302 B1
(45) Date of Patent: Dec. 7, 2010

(54) PRIORITIZING CARRIERS IN LOW-COST INTERNET-BASE-STATION (LCIB) FREQUENCY-HOPPING PILOT BEACONS

(75) Inventors: Ryan S. Talley, Overland Park, KS (US); Bryan T. Barbee, Olathe, KS (US); Timothy W. Sill, Platte City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 629 days.

(21) Appl. No.: 11/874,811

(22) Filed: Oct. 18, 2007

(51) Int. Cl.
*H04B 7/216* (2006.01)
*H04Q 7/20* (2006.01)

(52) U.S. Cl. .................. 370/342; 370/328; 370/395.21; 455/450; 455/562.1

(58) Field of Classification Search ...... 370/238.1–322, 370/341–344, 395.21, 395.41, 436–477; 375/E1.036; 379/219–234; 455/419–561, 455/562.1
See application file for complete search history.

(56) References Cited

U.S. PATENT DOCUMENTS

| | | | |
|---|---|---|---|
| 4,578,815 A * | 3/1986 | Persinotti | 455/15 |
| 6,721,331 B1 * | 4/2004 | Agrawal et al. | 370/448 |
| 7,117,015 B2 * | 10/2006 | Scheinert et al. | 455/561 |
| 7,457,295 B2 * | 11/2008 | Saunders et al. | 370/395.21 |
| 7,738,647 B2 * | 6/2010 | Davis et al. | 379/220.01 |
| 2002/0052201 A1 * | 5/2002 | Wilhelmsson et al. | 455/434 |
| 2004/0204097 A1 | 10/2004 | Scheinert et al. | |
| 2009/0176453 A1 * | 7/2009 | Wilhelmsson et al. | 455/41.2 |

* cited by examiner

*Primary Examiner*—Afsar M. Qureshi

(57) ABSTRACT

Methods and systems are provided for prioritizing carriers in low-cost Internet-base-station-(LCIB) frequency-hopping pilot beacons. In one embodiment, an LCIB provides a frequency-hopping pilot beacon that repeatedly cycles through transmitting pilot-beacon information on each of multiple carriers. The LCIB identifies a first list of mobile stations, as well as a first list of carriers. The LCIB uses the first list of mobile stations to identify a second list of carriers from among the first list of carriers, thereby identifying a third list of carriers consisting of any carriers that are in the first list of carriers but not in the second list of carriers. The LCIB then prioritizes the second list of carriers over the third list of carriers for inclusion in the frequency-hopping pilot beacon.

19 Claims, 4 Drawing Sheets

PRIORITIZING CARRIERS IN LOW-COST INTERNET-BASE-STATION (LCIB) FREQUENCY-HOPPING PILOT BEACONS

BACKGROUND

1. Technical Field

The present invention relates to wireless networks, and, more particularly, to wireless networks that include one or more Low-Cost Internet Base Stations (LCIBs).

2. Description of Related Art a. Cellular Wireless Networks

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1×RTT networks" (or "1× networks" for short), which stands for "Single Carrier Radio Transmission Technology." Another protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro (or macro-network) base stations" and the network they collectively form—or to which they collectively belong—is referred to generally and herein as the "macro network."

Mobile stations and macro base stations conduct communication sessions (e.g. voice calls and data sessions) over frequencies known as carriers, each of which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

Furthermore, using a sector as an example of a coverage area, macro base stations may provide service in a given sector on one carrier, or on more than one. An instance of a particular carrier in a particular sector is referred to herein as a sector/carrier. In a typical CDMA system, using a configuration known as radio configuration 3 (RC3), a macro base station can, on a given sector/carrier, transmit forward-link data on a maximum of 64 distinct channels at any time, each corresponding to a unique 64-bit code known as a Walsh code. Of these channels, typically, 61 of them are available as traffic channels (for user data), while the other 3 are reserved for administrative channels known as the pilot, paging, and sync channels.

When a macro base station instructs a mobile station—that is on a given sector/carrier—to use a particular traffic channel for a communication session, the macro base station does so by instructing the mobile station to tune to one of the 61 traffic channels on that sector/carrier. It is over that assigned traffic channel that the macro base station will transmit forward-link data to the mobile station during the ensuing communication session. And, in addition to that forward-link channel, the traffic channel also includes a corresponding Walsh-coded reverse-link channel, over which the mobile station transmits data to the macro base station.

b. Low-Cost Internet Base Stations (LCIBs)

Many macro-network subscribers, including private consumers and small businesses, among others, in addition to having wireless service (which may include data service) for their mobile station (or mobile stations), also have high-speed (a.k.a. "broadband") Internet access through another communication channel. This other channel may be cable-modem service, digital-subscriber-line (DSL) service, satellite-based Internet service, and/or some other option.

In an exemplary arrangement, a user may have a cable modem connected (a) via coaxial cable to a cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a WiFi packet-data interface to, as examples, laptop computers, digital video recorders (DVRs), appliances, and/or any other computing devices or their wireless network adapters.

To address gaps in macro-network coverage (e.g. in buildings) and for other reasons, macro-network service providers have recently begun offering consumers devices referred to herein as Low-Cost Internet Base Stations (LCIBs), which may also be referred to as femtocells (femto base stations, femto base transceiver stations (BTSs)), picocells (pico base stations, pico BTSs), microcells (micro base stations, micro BTSs), and by other names. Note that the aforementioned terms that end in "cell" may also be generally and herein used interchangeably to refer to the coverage area provided by the respective device. Note also that "low-cost" is not used herein as a limiting term; that is, devices of any cost may be categorized as LCIBs, though most LCIBs typically will be less expensive on average than most macro-network base stations.

A typical LCIB may be approximately the size of a desktop phone or WiFi access point, and is essentially a low-power, low-capacity version of a macro base station. Thus, a typical LCIB will use a normal power outlet, perhaps with a transformer providing a DC power supply. The LCIB may have a wired (e.g. Ethernet) or wireless (e.g. WiFi) connection with the user's router, and would thus have connectivity to the Internet and/or one or more other packet-data networks via the user's broadband connection. An LCIB may establish a virtual-private-network (VPN) connection over the Internet with an entity (e.g. a VPN terminator) on the wireless-service (macro-network) provider's core network, and thereby be able to securely communicate with the VPN terminator and other entities on that core network and beyond.

The LCIB also has a wireless-communication (e.g. CDMA) interface that is compatible with the user's mobile station(s), such that the LCIB may act as a micro base station, providing coverage on the wireless-service provider's network via the user's Internet connection. Usually, an LCIB will provide service on a single RF carrier (or on a single carrier per technology, where multiple technologies (i.e. CDMA, EV-DO) are supported), and also transmit what is known as a pilot beacon, which includes administrative messages and parameters that mobile stations can use to connect with the LCIB. And LCIBs typically include a Global Positioning System (GPS) receiver for use in receiving and decoding GPS signals, for use in determination of location, as well as for use in synchronizing operations with other LCIBs and with the macro network, based on timing information embedded in GPS signals. Typically, LCIBs have fairly comprehensive auto-configuration capabilities, such that they are largely "plug-and-play" to the user.

SUMMARY

Methods and systems are provided for prioritizing carriers in low-cost-Internet-base-station-(LCIB) frequency-hopping pilot beacons. In one aspect, an exemplary embodiment may take the form of a method for an LCIB to prioritize carriers on a frequency-hopping pilot beacon. In accordance with the method, the LCIB provides a frequency-hopping pilot beacon that repeatedly cycles through transmitting pilot-beacon information on each of multiple carriers. The LCIB identifies a first list of mobile stations. The LCIB identifies a first list of carriers. The LCIB uses the first list of mobile stations to identify a second list of carriers from among the first list of carriers, thereby identifying a third list of carriers consisting of any carriers that are in the first list of carriers but not in the second list of carriers. The LCIB then prioritizes the second list of carriers over the third list of carriers for inclusion in the frequency-hopping pilot beacon.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
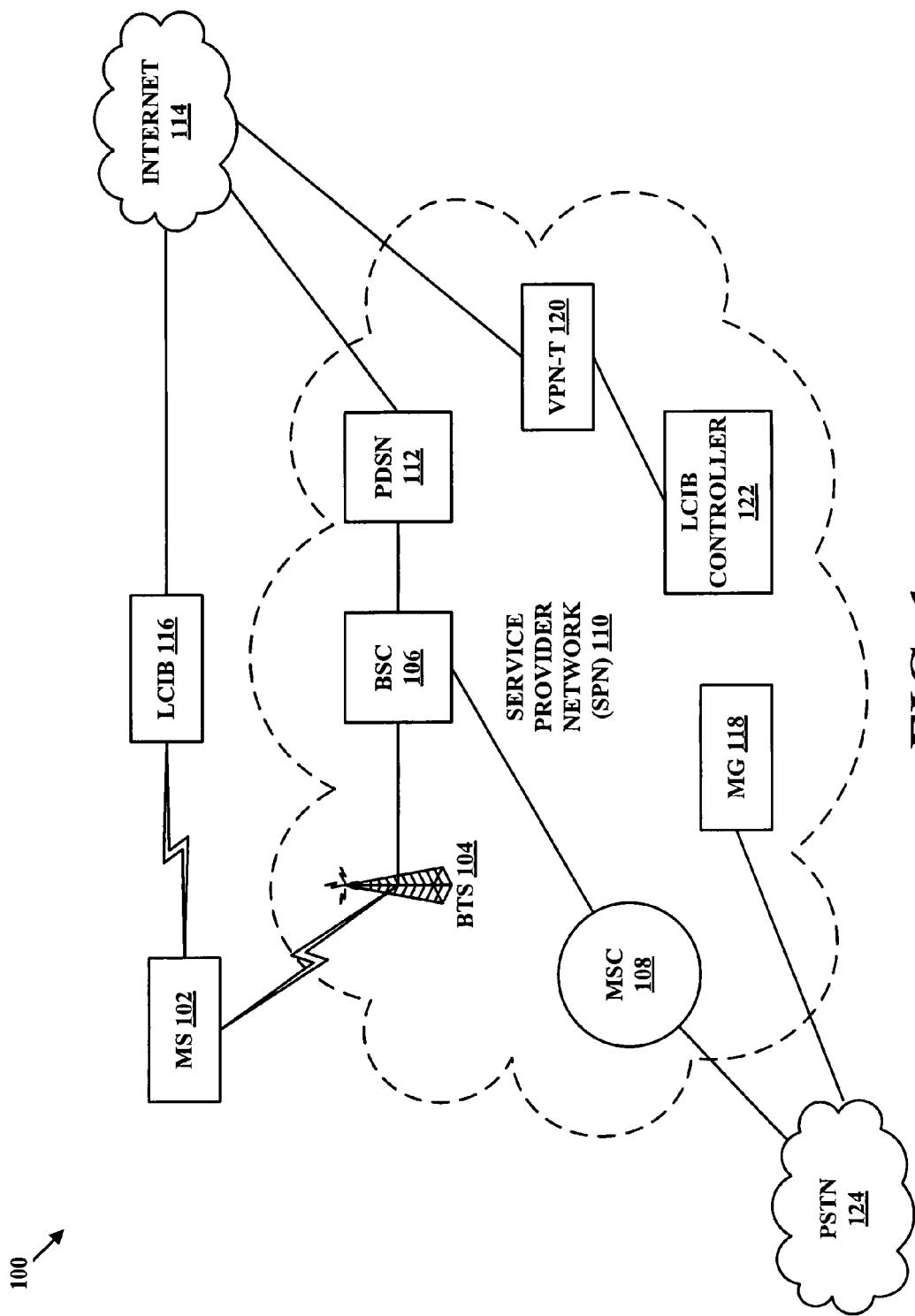
FIG. 1 is a simplified block diagram of a communication system, in accordance with exemplary embodiments.

As noted above, LCIBs are designed to have low transmission-power capabilities, and consequently to provide coverage areas that are relatively limited in comparison with those of typical macro base stations. As examples, a typical LCIB may be designed to provide a coverage area that is the size of a dorm room, an apartment, a house, and so on. And along with limited transmission power, LCIBs are also designed to have a relatively low capacity for serving mobile stations. For example, an LCIB may provide a single CDMA carrier and have the capacity (e.g. channel elements) to provide service to up to five mobile stations at any given time, though any suitable number of channel elements (and/or carriers) may be used in a given implementation.

As described, LCIBs typically emit a pilot beacon that includes administrative messages and parameters that mobile stations can use to facilitate handoffs from the macro network to the LCIB's carrier. In particular, the pilot beacon typically includes channels known as the pilot, paging, and sync channels. Thus, among the purposes of the LCIB's pilot beacon is to advertise the LCIB's carrier in the LCIB's coverage area, such that mobile stations can opt to tune to that carrier and communicate via the LCIB. As such, the LCIB transmits its pilot beacon on the one or more macro-network carriers in the surrounding area, and more particularly, on the forward-link component of each of those one or more macro-network carriers.

In particular, after an initial auto-configuration process, an LCIB will transmit either what is known as and referred to herein as a "fixed" pilot beacon, or what is known as and referred to herein as a "frequency-hopping" pilot beacon. If the one or more macro base stations in the surrounding area all operate on the same carrier, the LCIB will transmit its pilot beacon on only that carrier (i.e. a fixed pilot beacon). If, multiple carriers are provided by the surrounding macro network, however, the LCIB will cycle through those carriers, transmitting its pilot beacon on each macro-network carrier for a fixed period of time (i.e. a frequency-hopping pilot beacon), such as a few hundred milliseconds or one or two seconds.

In the case of a frequency-hopping pilot beacon, the LCIB will typically transmit its pilot-beacon information on each carrier in a set of carriers for a fixed amount of time, and then repeat. Thus, the overall cycle takes a finite amount of time, and the LCIB typically needs to spend some minimum amount of time on each carrier. Taken together, this limits the total number of carriers on which the LCIB can transmit its pilot-beacon information each cycle to some upper-bound number of carriers. However, the total number of macro-network carriers provided by the surrounding macro network may exceed this upper bound. As such, the LCIB's pilot beacon may not hop to some macro-network carriers, which may cause mobile stations operating on those carriers to not be aware of the LCIB.

As such, in accordance with the present invention, the LCIB prioritizes certain macro-network carriers over others for inclusion in the frequency-hopping pilot beacon, which is to say inclusion in the set of carriers on which the frequency-hopping pilot beacon hops. The LCIB identifies a list of carriers provided by the nearby macro network. The LCIB then determines which subset of those carriers a particular group of mobile stations will themselves select for service, and then prioritizes those carriers for inclusion in the frequency-hopping pilot beacon. The particular group of mobile stations could be a list of "home" mobile stations for the LCIB (e.g. those authorized to use the LCIB), a list of the mobile stations that are currently registered with the LCIB, a combination thereof, or perhaps some other group of mobile stations.

The LCIB may obtain the list of macro-network carriers from which to select by wirelessly receiving a channel-list message from a nearby macro sector, or perhaps by accessing a remote database to acquire the list, perhaps using an identifier of a nearby macro sector, an identifier of the LCIB, the location of the LCIB, and/or some other search key(s). The LCIB may then identify the subset of carriers (to be prioritized) from that list by using the same hash algorithm that each of the particular group of mobile stations will use to select a carrier from that list. By knowing which carriers the particular group of mobile stations will select, the LCIB knows which carriers to be sure to include/prioritize in its pilot beacon.

With respect to the manner in which the LCIB prioritizes the identified subset of the surrounding-macro-network carriers, numerous options exist. The LCIB could simply make sure that each carrier in the subset is included in each cycle of the pilot beacon. If the number of carriers in the identified subset exceeds the number of carriers on which the pilot beacon can hop each cycle, the LCIB may include those carriers on which the highest number of mobile stations will hop. The LCIB may instead include as many carriers from the identified subset as it can in a given cycle, and then include the remaining carriers from the subset in the next cycle(s).

In other embodiments, the LCIB may hop to the subset carriers before the other surrounding-macro-network carriers each cycle. In general, prioritizing the carriers that the particular group of mobile stations (i.e. home/authorized mobiles and/or registered mobiles) will self-select does not exclude the possibility of still hopping onto the other surrounding macro-network carriers. The LCIB may include the subset carriers more often than the other carriers. On that point, the LCIB may include the subset carriers more times per cycle, or perhaps in more cycles per hour, per day, etc. than the other carriers. And other possibilities exist, without departing from the scope and spirit of the present invention.

2. Exemplary Architecture a. An Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a macro BTS 104, a base station controller (BSC) 106, a mobile switching center (MSC) 108, a service provider network (SPN) 110, a packet data serving node (PDSN) 112, the Internet 114, an LCIB 116, a media gateway 118, a VPN terminator (VPN-T) 120, an LCIB controller 122, and a public switched telephone network (PSTN) 124. And additional entities could be present, such as additional mobile stations in communication with BTS 104, additional entities in communication with Internet 114 and/or PSTN 124, etc. Also, there could be one or more devices and/or networks making up at least part of one or more communication links. For example, there could be one or more routers, cable modems, and/or other devices or networks on the link between LCIB 116 and Internet 114.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may include an antenna and a chipset suitable for communicating with one or more macro base stations and/or one or more LCIBs over suitable air interfaces. For example, the chipset could be suitable for CDMA communication. The chipset or wireless-communication interface in general may also be able to communicate with other types of networks and devices, such as EV-DO networks, Wi-Fi networks, Bluetooth devices, and/or one or more additional types of networks and devices. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

Macro BTS 104 may be any network element arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more CDMA coverage areas such as cells and sectors, for communicating with mobile stations such as mobile station 102 over an air interface. The communication interface may also include one or more wired (e.g. Ethernet) and/or wireless (e.g. WiFi) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least macro BTS 104, MSC 108, and PDSN 112. In general, BSC 106 functions to control one or more macro BTSs such as macro BTS 104, and to provide those one or more macro BTSs with connections to devices such as MSC 108 and PDSN 112.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, and/or any other entity, without departing from the invention. And it should be noted that the macro network and/or the LCIB(s) described herein may operate according to CDMA, EV-DO, iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and/or any other wireless technology or technologies now known or later developed.

MSC 108 may be any networking element arranged to carry out the MSC functions described herein. Thus, MSC 108 may include a communication interface, a processor, and data storage comprising instructions executable by the processor to carry out those MSC functions. The communication interface may include one or more wired and/or wireless interfaces for communicating with at least BSC 106 and PSTN 124. In general, MSC 108 acts as a switch between PSTN 124 and one or more BSCs such as BSC 106, facilitating communication between mobile stations and PSTN 124, which may be the public switched telephone network.

Service-provider network 110 may encompass all of the network elements depicted in FIG. 1 as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and Internet 114. In general, PDSN 112 acts as a network access server between Internet 114 and BSCs such as BSC 106, facilitating packet-data communication between mobile stations and Internet 114, via macro base stations.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

LCIB 116 may be any computing and communication device arranged to carry out the LCIB functions described herein. As such, LCIB 116 may include a communication interface, a processor, and data storage comprising instructions executable by the processor for carrying out those LCIB functions. The communication interface may include a wireless interface for communicating with one or more mobile stations according to a protocol such as CDMA (and/or one or more other technologies), as well as an Ethernet or WiFi interface for communicating with a device such as a router and/or a cable modem. LCIB 116 may also have a GPS receiver and/or other location module. LCIB 116 is also described in connection with FIG. 2.

Media gateway (MG) 118 may be any networking element arranged to carry out the media-gateway functions described herein. As such, MG 118 may include a communication interface, a processor, and data storage comprising instructions executable by the processor for carrying out those media-gateway functions. The communication interface may include a circuit-switched interface and a packet-switched interface. MG 118 may (a) receive packet-based communications from SPN 110, convert those to circuit-switched communications, and pass them to PSTN 124 and (b) receive circuit-switched communications from PSTN 124, convert those to packet-based communications, and pass them to SPN 110.

VPN terminator 120 may be any networking element arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least LCIB controller 122 and Internet 114. In general, VPN terminator 120 functions to establish secure VPN connections over Internet 114 with LCIBs such as LCIB 116, enabling the LCIBs to securely communicate with devices on SPN 110, such as LCIB controller 122, and perhaps beyond.

LCIB controller 122 may be any networking element arranged to carry out the LCIB-controller functions described herein. Thus, LCIB controller 122 may include a communication interface, a processor, and data storage comprising instructions executable by the processor for carrying out those LCIB-controller functions. The communication interface may include one or more wired and/or wireless interfaces for communicating with at least VPN terminator 120, along with perhaps one or more other entities on service-provider network 110, and beyond.

Among other functions, LCIB controller 122 communicates via VPN terminator 120 with LCIBs such as LCIB 116. LCIB controller 122 may receive requests from various LCIBs for configuration data, and those requests may include, among other values, indications of the LCIBs' respective locations. LCIB controller 122 may also be operable to select various operational parameters for LCIBs (e.g. carrier, PN offset, whether to broadcast a pilot-beacon, contents of any pilot beacon to be broadcast, transmission-power level), and to transmit those parameters to LCIBs, perhaps along with other configuration data and messaging.

b. An Exemplary LCIB

Figure 2:
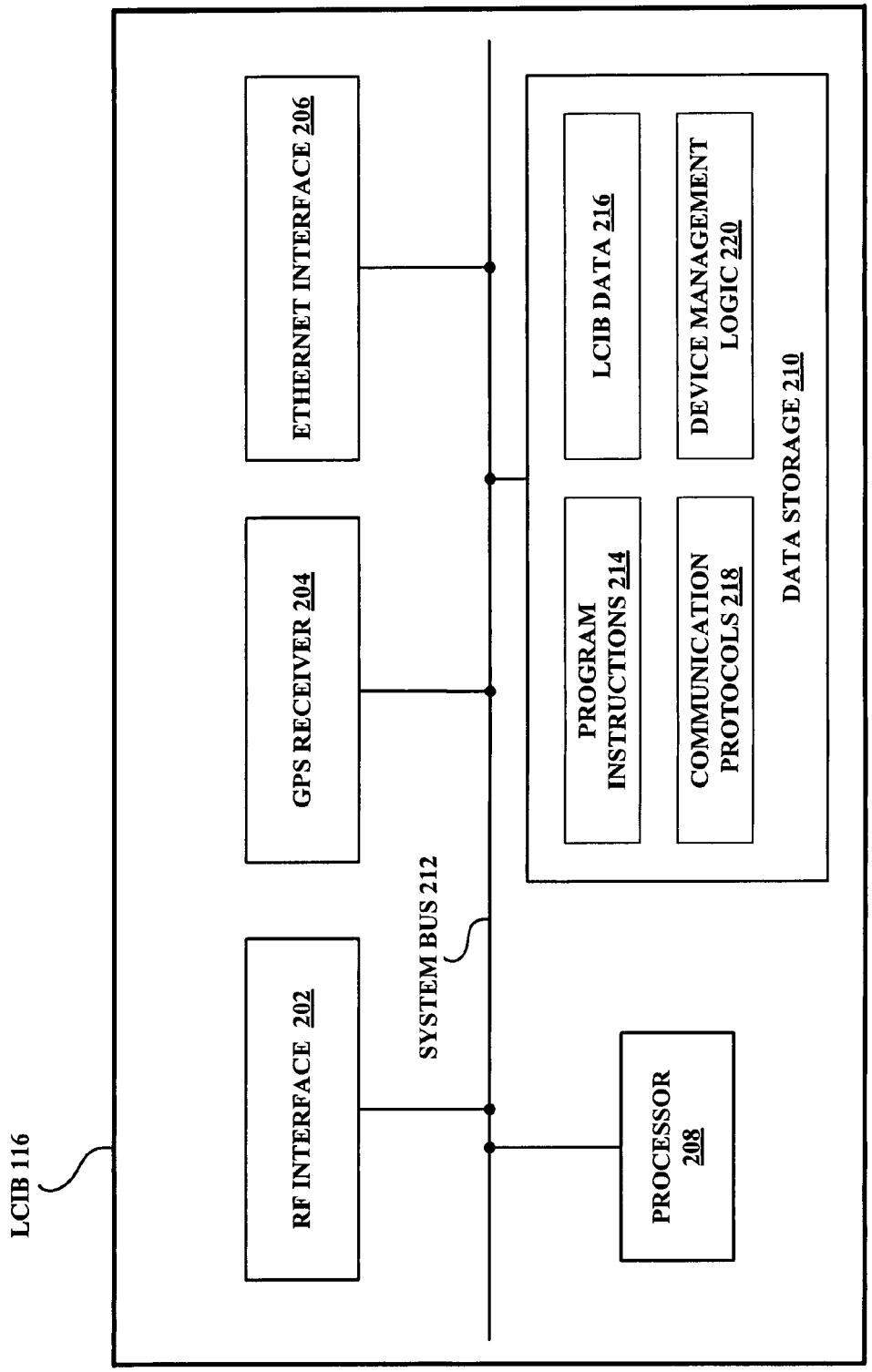
FIG. 2 is a simplified block diagram of an LCIB, in accordance with exemplary embodiments.

FIG. 2 depicts an exemplary diagram of LCIB 116, which includes an RF interface 202, a GPS receiver 204, an Ethernet interface 206, a processor 208, and data storage 210, all communicatively linked by a system bus 212. Note that LCIB 116 could have additional and/or different components, and that this structure is provided by way of example.

RF interface 202 may include one or more antennas, one or more chipsets, a set of one or more channel elements, and/or one or more other components suitable for providing a wireless coverage area according to a wireless-communication protocol such as CDMA (and/or one or more other wireless technologies). GPS receiver 204 may be any known or hereafter developed GPS receiver, suitable for receiving and decoding GPS signals for location and timing purposes, perhaps among other purposes. In some embodiments, an LCIB may have a location module in addition to or instead of a GPS receiver.

Ethernet interface 206 may provide a wired packet-data interface for communicating with a device such as a router or cable modem. Processor 208 may comprise multiple (e.g., parallel) processors, such as a general purpose microprocessor and/or a discrete digital signal processor. The data storage 210 may take various forms, in one or more parts, such as a non-volatile storage block and/or a removable storage medium, and may include (a) program instructions 214 executable by processor 208 for carrying out the LCIB functions described herein, (b) LCIB data 216, which may be any operational data or other type of data stored for use by LCIB 116, (c) communication protocols 218, facilitating and enabling communication with one or more other devices, and (d) device management logic 220, perhaps for memory and file management.

3. Exemplary Operation a. A First Exemplary Method

Figure 3:
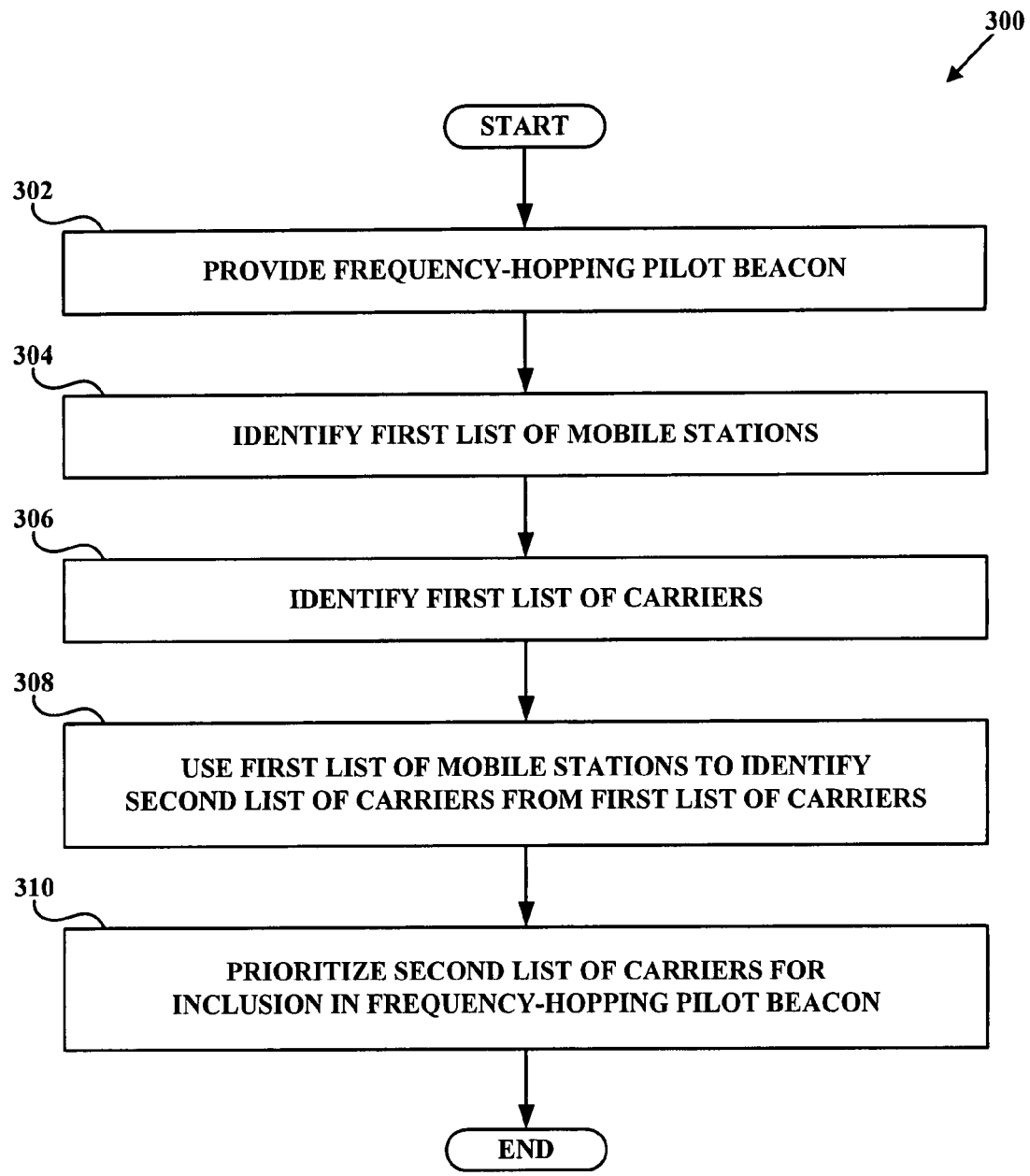
FIG. 3 is a flowchart of a method, in accordance with exemplary embodiments.

FIG. 3 depicts a flowchart of an exemplary method, in accordance with an exemplary embodiment. In particular, FIG. 3 depicts a method 300 for an LCIB to prioritize carriers on a frequency-hopping pilot beacon. As shown in FIG. 3, method 300 begins at step 302, when LCIB 116 provides a frequency-hopping pilot beacon that repeatedly cycles through transmitting pilot-beacon information on each of multiple carriers. At step 304, LCIB 116 identifies a first list of mobile stations. At step 306, LCIB 116 identifies a first list of carriers. At step 308, LCIB 116 uses the first list of mobile stations to identify a second list of carriers from among the first list of carriers, thereby identifying a third list of carriers consisting of any carriers that are in the first list of carriers but not in the second list of carriers. At step 310, LCIB 116 prioritizes the second list of carriers over the third list of carriers for inclusion in the frequency-hopping pilot beacon. These steps are further explained in the following subsections.

And it should be noted that, although method 300 is described as being carried out by LCIB 116, this is not required. In some embodiments, method 300 may be carried out by LCIB 116 in cooperation with one or more other network entities, such as VPN terminator 120 and LCIB controller 122. In general, method 300 could be carried out by any one or any combination of the network elements described herein, or any other network element(s).

i. Provide Frequency-Hopping Pilot Beacon

At step 302, LCIB 116 provides a frequency-hopping pilot beacon that repeatedly cycles through transmitting pilot-beacon information on each of multiple carriers. As explained above, this pilot beacon may include a pilot channel, a paging channel, and a sync channel. In general, the pilot-beacon information includes messages and parameters that mobile stations can use to facilitate handoffs from macro-network carriers to LCIB 116's carrier. As such, LCIB 116 causes its pilot beacon to cyclically hop to multiple macro-network carriers on which service is provided by the macro network in the surrounding area.

ii. Identify List of Mobile Stations

At step 304, LCIB 116 identifies a first list of mobile stations. As stated, the LCIB may be associated with a list of home mobile stations for the LCIB, which could be the only mobile stations authorized to communicate via the LCIB, or could be a group of mobile stations that get preferential treatment by the LCIB, as examples. The first list of mobile stations may be or include this list of LCIB 116's home mobile stations. The first list of mobile stations may also be or include any mobile stations that are currently registered for service with LCIB 116. And other possibilities exist as well.

iii. Identify First List of Carriers

At step 306, LCIB 116 identifies a first list of carriers. The first list of carriers may be a list of carriers on which service is provided in a nearest macro-network coverage area, or perhaps in a combination of nearby macro-network coverage areas. Each such coverage area could be a cell or a sector, as examples, and could operate according to a protocol such as CDMA or EV-DO, or perhaps both. And other protocols and combinations thereof may be used as well.

With respect to how LCIB 116 goes about identifying the first list of carriers, several possibilities exist. LCIB 116 could use an internal CDMA receiver to wirelessly receive the first list of carriers, perhaps in the form of a channel-list message (CLM) from the nearest macro sector. In general, the CLM is a message that macro base stations (sectors) emit, to convey to mobile stations a list of carriers on which the macro base station provides service.

As another option, LCIB 116 could query a local or remote database using an identifier of the nearest macro sector, an identifier of LCIB 116, the location of LCIB 116, and/or some other search criteria. Using location as an example, a remote server could determine the nearest macro base station to LCIB 116, and further determine based on orientation which sector of that nearest macro base station is directed towards LCIB 116. That sector is then considered the nearest macro sector to LCIB 116, and that sector's CLM could be sent over the Internet to LCIB 116. And other possibilities exist as well.

iv. Use List of Mobile Stations to Identify Second List of Carriers from Among the First List of Carriers At step 308, LCIB 116 uses the first list of mobile stations to identify a second list of carriers from among the first list of carriers, thereby identifying a third list of carriers consisting of any carriers that are in the first list of carriers but not in the second list of carriers. In general, each mobile station in the first list of mobile stations may be arranged to select a carrier from the first list of carriers. As such, step 308 may involve selecting those carriers in the first list that the mobile stations in the first list of mobile stations will select.

In particular, each mobile station in the first list of mobile stations may be arranged to select a carrier from the first list of carriers using a standard hash function, and step 308 may involve using that same standard hash function to identify the second list of carriers. As one possibility, the mobile stations may each use their mobile identification number (MIN) as an input to the standard hash function, and thereby select a carrier for themselves from the CLM, which in general distributes mobile stations among macro carriers.

LCIB 116 may similarly use the MINs of the mobile stations in the first list of mobile stations as inputs into the hash function, in order to create the second list of carriers from among the carriers in the CLM. That is, LCIB 116 will populate the second list of carriers with the carriers from the nearest macro sector's CLM that the mobile stations in the first list of mobile stations would self-select. Doing so effectively identifies a third list of carriers, consisting of any carriers in the first list not chosen for the second list. In effect, the CLM is split into the second (prioritized) and third (not prioritized) lists.

v. Prioritize the Second List of Carriers in the Pilot Beacon

At step 310, LCIB 116 prioritizes the second list of carriers over the third list of carriers for inclusion in the frequency-hopping pilot beacon. This may take the form of including only the carriers in the second list of carriers in the pilot beacon. Another possibility is including the carriers in the second list more often than the carriers in the third list. In cases where the number of carriers in the second list exceeds the number of carriers that can be included in a given cycle of the pilot beacon, step 310 may involve prioritizing the carriers in the second list by how many mobiles will select those carriers. Additional carriers from the second list could be included in a subsequent cycle (or in subsequent cycles). Furthermore, carriers from the third list may be included in the pilot beacon occasionally as well.

In cases where the first list of mobile stations includes both the home mobile stations for LCIB 116 and mobile stations that are currently registered with LCIB 116 (in cases where non-home mobiles are permitted to use LCIB 116), either group could be given priority over the other. That is, LCIB 116 may use this combined list of mobile stations to select from the macro CLM the carriers that those mobile stations will themselves select. LCIB 116 may then prioritize—such as by order or frequency of hopping—those carriers that the home mobiles will select over those carriers that the registered-but-not-home mobiles will select. In other embodiments, LCIB 116 may prioritize the carriers that currently-registered mobiles will select over home-but-not-currently-registered mobiles. And other possibilities exist as well.

b. A Second Exemplary Method

Figure 4:
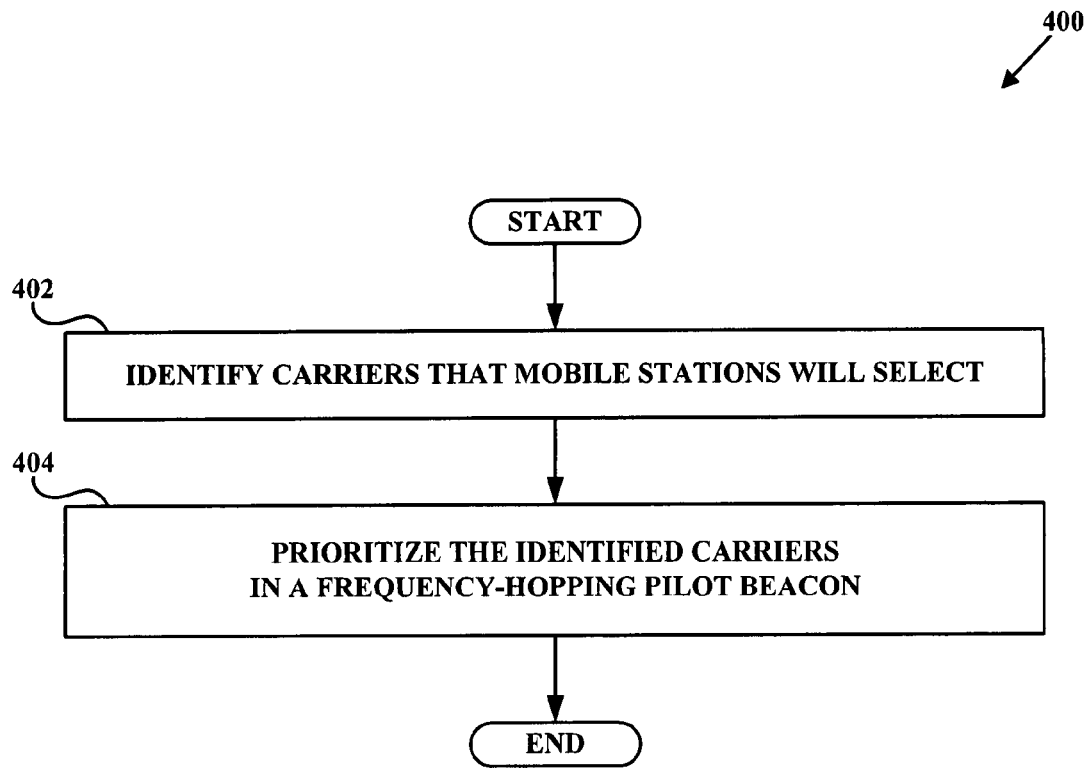
FIG. 4 is a flowchart of a method, in accordance with exemplary embodiments.

FIG. 4 is a flowchart of a second exemplary method, in accordance with an exemplary embodiment. In particular, FIG. 4 depicts a method 400, which may be carried out by an LCIB, such as LCIB 116, or perhaps by an LCIB in cooperation with one or more other entities, such as VPN terminator 120 and/or LCIB controller 122. Method 400 is similar in some respects to method 300, and thus is not described in as great of detail.

As shown in FIG. 4, method 400 begins at step 402, when LCIB 116 identifies a set of carriers that a set of mobile stations will select for service. The set of mobile stations may be a set of home mobiles for LCIB 116 and/or a set of mobiles that are currently registered with LCIB 116, as examples. LCIB 116 may use the MINs of those mobiles as inputs to a standard hash function, to identify the set of carriers from among a macro-network CLM. At step 404, LCIB 116 prioritizes the identified set of carriers in a frequency-hopping pilot beacon, perhaps according to any manner described herein, or some other manner of prioritization.

4. Conclusion

Various exemplary embodiments have been described above. Those skilled in the art will understand, however, that changes and modifications may be made to those examples without departing from the scope of the claims.

The invention claimed is:

1. A method for a low-cost Internet base station (LCIB) to prioritize carriers on a frequency-hopping pilot beacon, the method comprising:
providing a frequency-hopping pilot beacon that repeatedly cycles through transmitting pilot-beacon information on each of multiple carriers;
identifying a first list of mobile stations;
identifying a first list of carriers;
using the first list of mobile stations to identify a second list of carriers from among the first list of carriers, thereby identifying a third list of carriers consisting of any carriers that are in the first list of carriers but not in the second list of carriers; and
prioritizing the second list of carriers over the third list of carriers for inclusion in the frequency-hopping pilot beacon.

2. The method of claim 1, wherein the frequency-hopping pilot beacon comprises a pilot channel, a paging channel, and a sync channel.

3. The method of claim 1, wherein the LCIB is associated with a list of home mobile stations, and wherein the first list of mobile stations comprises the list of home mobile stations.

4. The method of claim 3, wherein the first list of mobile stations consists of the list of home mobile stations.

5. The method of claim 3, wherein the first list of mobile stations comprises any mobile stations that are currently registered with the LCIB.

6. The method of claim 5, wherein prioritizing the second list of carriers over the third list of carriers comprises prioritizing (i) any carriers that mobile stations in the list of home mobile stations will select over (ii) any carriers that mobile stations currently registered with the LCIB but not in the list of home mobile stations will select.

7. The method of claim 5, wherein prioritizing the second list of carriers over the third list of carriers comprises prioritizing (i) any carriers that mobile stations currently registered with the LCIB will select over (ii) any carriers that mobile stations in the list of home mobile stations but not currently registered with the LCIB will select.

8. The method of claim 1, wherein the first list of mobile stations comprises any mobile stations that are currently registered with the LCIB.

9. The method of claim 8, wherein the first list of mobile stations consists of any mobile stations that are currently registered with the LCIB.

10. The method of claim 1, wherein identifying the first list of carriers comprises identifying a list of carriers on which service is provided in a nearest macro-network coverage area.

11. The method of claim 10, wherein the nearest macro-network coverage area is at least one of a cell, a sector, a code division multiple access (CDMA) coverage area, an Evolution Data Optimized (EV-DO) coverage area, and a WiMax coverage area.

12. The method of claim 10, wherein identifying the list of carriers on which service is provided in the nearest macro-network coverage area comprises wirelessly receiving the list of carriers on which service is provided in the nearest macro-network coverage area.

13. The method of claim 12, wherein the list of carriers on which service is provided in the nearest macro-network coverage area comprises a code division multiple access (CDMA) channel-list message (CLM).

14. The method of claim 10, wherein identifying the list of carriers on which service is provided in the nearest macro-network coverage area comprises querying a database using at least one of a location of the LCIB, an identifier of the LCIB, and an identifier of the nearest macro-network coverage area.

15. The method of claim 1, wherein each mobile station in the first list of mobile stations is arranged to select a carrier from the first list of carriers, and wherein using the first list of mobile stations to identify the second list of carriers comprises selecting those carriers in the first list of carriers that the mobile stations in the first list of mobile stations will select.

16. The method of claim 15, wherein each mobile station in the first list of mobile stations is arranged to select a carrier from the first list of carriers using a first hash function, and wherein selecting those carriers in the first list of carriers that the mobile stations in the first list of mobile stations will select comprises using the first hash function.

17. The method of claim 16, wherein using the first hash function comprises using a mobile identification number (MIN) as an input into the first hash function.

18. The method of claim 1, wherein prioritizing the second list of carriers over the third list of carriers comprises at least one of (a) including in the pilot beacon only the carriers in the second list, (b) including in the pilot beacon the carriers in the second list more often than the carriers in the third list, and (c) prioritizing in the pilot beacon the carriers in the second list based on how many mobile stations in the first list of mobile stations will select those carriers.

19. A low-cost Internet base station (LCIB) comprising:
a communication interface;
a processor; and
data storage comprising instructions executable by the processor to:

provide a frequency-hopping pilot beacon that repeatedly cycles through transmitting pilot-beacon information on each of multiple carriers;

identify a first list of mobile stations;

identify a first list of carriers;

use the first list of mobile stations to identify a second list of carriers from among the first list of carriers, thereby identifying a third list of carriers consisting of any carriers that are in the first list of carriers but not in the second list of carriers; and prioritize the second list of carriers over the third list of carriers for inclusion in the frequency-hopping pilot beacon.

* * * * *